United States Patent
Watanabe et al.

(10) Patent No.: US 6,482,761 B1
(45) Date of Patent: Nov. 19, 2002

(54) TRANSLUCENT ALUMINA SINTERED BODY AND A PROCESS FOR PRODUCING THE SAME

(75) Inventors: Hisashi Watanabe, Niihama (JP); Yoshio Uchida, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/648,812

(22) Filed: Aug. 28, 2000

(30) Foreign Application Priority Data

Aug. 30, 1999 (JP) ............................. 11-243125

(51) Int. Cl.$^7$ ............................. C04B 35/10
(52) U.S. Cl. ...................... 501/153; 501/127
(58) Field of Search ................. 501/153, 127

(56) References Cited

U.S. PATENT DOCUMENTS

| | | | |
|---|---|---|---|
| 3,026,210 A | 3/1962 | Coble ........................ | 106/39 |
| 4,285,732 A | 8/1981 | Charles et al. .............. | 501/153 |

FOREIGN PATENT DOCUMENTS

| | | |
|---|---|---|
| DE | 100 03 505 A1 | 9/2000 |
| EP | 0 567 095 A1 | 10/1993 |
| EP | 0 645 476 A2 | 3/1995 |
| EP | 0 747 333 A1 | 12/1996 |

OTHER PUBLICATIONS

WPI Abstract of Japanese Patent Application No. 2000–219570.
WPI Abstract of Japanese Patent Application No. 06–191836.
WPI Abstract of Japanese Patent Application No. 04–370643.
WPI Abstract of Japanese Patent Application No. 08–301666.
WPI Abstract of Japanese Patent Application No. 08–245259.
WPI Abstract of Japanese Patent Application No. 04–193760.
WPI Abstract of Japanese Patent Application No. 06–191833.
FC Report 13 (1995) No. 11.
J. Illum. Engng. Inst. Jpn. vol. 74, No. 9 (1990).

*Primary Examiner*—C. Melissa Koslow
(74) *Attorney, Agent, or Firm*—Sughrue Mion, PLLC

(57) ABSTRACT

A translucent alumina sintered body wherein the total content of an alkali metal element and an alkaline earth metal element is 50 ppm or less, and the linear transmittance of a light having a wavelength of 600 nm is 40% or more at a thickness of the sintered body of 0.85 mm.

10 Claims, No Drawings

TRANSLUCENT ALUMINA SINTERED BODY AND A PROCESS FOR PRODUCING THE SAME

FIELD OF THE INVENTION

The present invention relates to a translucent alumina sintered body wherein the content of an alkali metal element and an alkaline earth metal element is small (hereinafter, abbreviated as translucent alumina), and a method for producing the same.

BACKGROUND OF THE INVENTION

The durability of translucent alumina used in an arc tube of a high brilliance lamp has a relation to the whole life of the lamp and significantly influences commodity value. Recently, in particular, for enhancing the brightness and color performing property of a lamp, the pressure and temperature of a filler gas in an arc tube are raised, and higher corrosion resistance to an acid and alkali, halogen and ion plasma is required. Also in uses of a semiconductor production apparatus and the like, for example, in a plasma etching apparatus member, plasma energy in etching is raised for increasing pit depth accompanying high integration, and translucent alumina excellent in corrosion resistance is required.

Corrosion of an alumina sintered body by an acid solution or alkaline solution or halogen gas and plasma is caused mainly due to remaining pores and impurities. In the case of translucent alumina, remaining pores are small and the content thereof is small, therefore, corrosion resistance is influenced significantly by impurities. Though it is most general to use magnesium as a sintering agent in sintering translucent alumina, when magnesium oxide is present in large amount, the corrosion resistance of an alumina sintered body against ion plasma and halogen gas and acid solution or alkali solution lowers (U.S. Pat. No. 3,026,210, JP-A No. 8-245259, J.Illum.Engng.Inst.vol. 74 (1990), No. 9, p. 34).

In addition to magnesium added as a sintering agent, an alumina raw material powder, and alkali metal elements (Li, Na, K, Rb, Cs, Fr), particularly, Li, Na, K or alkaline earth metal elements (Be, Mg, Ca, Sr, Ba, Ra), particularly, Ca, mixed in an alumina sintered body production process, manifest a chemical reaction with ion plasma and halogen gas and acid solution or alkali solution and the like. Therefore, it is important, for enhancing the durability of translucent alumina, to control the amount of an alkali metal element and alkaline earth metal element in a sintered body to the lowest necessary level.

However, in sintering under reducing atmosphere from atmospheric pressure to vacuum so far, when magnesium oxide is not present or the presence amount thereof is small, translucent alumina is not obtained due to abnormal grain growth. Further, FC Report, vol. 13 (1995), No. 11, p. 308 wherein an effective sintering agent for suppressing grain growth other than magnesium oxide is not known, also discloses that magnesium oxide is inevitable in sintering translucent alumina and magnesium oxide having a concentration of at least 100 ppm or more is necessary.

On the other hand, a method for producing translucent alumina having extremely small magnesium content are described in JP-A Nos. 4-193760 and 4-370643. However, there are problems that this method is not a constant pressure sintering method and a high pressure treating equipment such as a hot isostatic press and the like is necessary, leading to high cost, and a large scale sintered body can not be produced, and the like.

Further, a method for producing translucent alumina in which magnesium is not added at all is described in JP-A No. 8-301666. However, also this method has problems that (1) it is necessary to effect washing with a chelating agent since translucency is significantly influenced by a small amount of an impurity in a raw material or a prefired body, (2) an expensive oxide of a transition metal element is necessary as an additive, (3) a hot isostatic press apparatus is necessary in a production step, leading to complicated process and higher cost, as well as other problems.

OBJECT OF THE INVENTION

The present inventors have intensively studied for solving the above-mentioned problems, and resultantly found that the intended translucent alumina sintered body is obtained by using a mixed powder prepared by adding a sintering agent which is low content of a magnesium compound to an α alumina powder comprises a polyhedral primary particle having substantially no fractured surface and sintering the mixed powder under specific condition, and have completed the present invention.

SUMMARY OF THE INVENTION

Namely, the present invention provides the following aspects (1) to (2).

(1) A translucent alumina sintered body wherein the total content of an alkali metal element and an alkaline earth metal element is 50 ppm or less, and the in-line transmittance of a light having a wavelength of 600 nm is 40% or more at a thickness of the sintered body of 0.85 mm.

(2) A method for producing a translucent alumina sintered body described in (1), wherein the sintered body is obtained by molding a mixed powder prepared by adding a sintering agent to an α alumina powder which comprises a polyhedral primary particle having substantially no fractured surface, has a BET specific surface area of 1 to 10 $m^2/g$ and has a purity of 99.99% or more, and sintering the green body at a temperature of from 1700 to 1900° C. under reducing atmosphere of from atmospheric pressure to vacuum.

DETAILED DESCRIPTION OF THE INVENTION

The present invention will be illustrated in detail below.

First, the translucent alumina sintered body of the present invention will be described.

The translucent alumina sintered body of the present invention is a translucent alumina sintered body wherein total content of an alkali metal element and an alkaline earth metal element is as low as 50 ppm or less, and the in-line transmittance of a light having a wavelength of 600 nm is 40% or more at a thickness of the sintered body of 0.85 mm. Further, the average grain size of the alumina sintered body is preferably 5 μm or more to 50 μm or less, and the maximum grain size is preferably 1.5-fold or more of the average grain size and it is preferable that the microstructure is uniform.

Next, the method for producing an alumina sintered body of the present invention will be illustrated.

As the alumina used as a raw material in the production method of the present invention, namely, as the α alumina powder having a BET specific surface area of 1 to 10 $m^2/g$ comprising a polyhedral primary particle having substantially no fractured surface, there is listed an α alumina powder obtained by sintering transition alumina or an alumina powder which is converted to transition alumina by heat treatment in a gas atmosphere containing hydrogen chloride, and said α alumina is obtained according to a method for producing an alumina powder having an alumina purity of as high as 99.99% or more comprising a single crystal particle of α alumina described in JP-A Nos. 6-191833, 6-191836 and the like.

As the above-mentioned α alumina powder used as a raw material in the production method of the present invention, there are listed, for example, SUMICORUNDUM AA03 (primary particle diameter: 0.3 μm), AA04 (primary particle diameter: 0.4 μm), AA05 (primary particle diameter: 0.5 μm) and AA07 (primary particle diameter: 0.7 μm) manufactured by Sumitomo Chemical Co., Ltd. The purities thereof are all 99.99 wt % or more. The alkali metal element and alkaline earth metal element contained in AA04 are in the alkali metal element, Li=0.01 ppm, K<2 ppm, Na=1.7 ppm, and in the alkaline earth metal, Be<0.05 ppm, Mg=0.62 ppm, Ca<1 ppm, Sr<0.1 ppm, Ba<2 ppm, according to a glow discharge mass spectrometry (GD-MS).

α alumina used in the present invention is a nearly monodispersed powder that a primary particle is uniform and a defect is not contained, the D/H ratio of the particle is 0.5 or more to 3.0 or less, and primary particles are not mutually agglomerated, in addition to a purity of 99.99% or more. If this powder is used as a raw material, a green body having uniform packing structure is obtained.

In a conventional high purity alumina powder, the particle size distribution is wide, a fine particle and an agglomerate of a fine particle and the like are present, in addition amorphous form of a primary particle, therefore, the sintering speed varies depending on site in green body and resultantly, large pores are present in significant amount in the sintered body. For improving irregularity of the sintering speed as described above, addition of a larger amount of sintering agents is required. Whereas, in the α alumina used in the present invention, the particle packing structure in a green body is uniform as described above, consequently, the sintering speed does not include irregularity and there is no abnormal grain growth remaining large pores. Accordingly, there can be produced translucent alumina having excellent corrosion resistance, by sintering under reducing atmosphere from atmospheric pressure to vacuum, in which the addition amount of magnesium as a sintering agent can be reduced, and the alumina purity is 99.99% or more, leading to extremely small content of an alkali metal element and an alkaline earth metal element, as compared with the conventional method using a high purity alumina powder as a raw material.

The alumina particle, main raw material of the present invention, has a BET specific surface area preferably from 1 to 10 $m^2/g$. When the BET specific surface area is less than 1 $m^2/g$, a pore having a diameter of over 0.15 μm may be present in a green body, and a sintering temperature of 1900° C. or more is necessary for densification. While when the BET specific surface area is over 10 $m^2/g$, the sintering speed may be non-uniform due to agglomeration of particles, and consequently, the addition amount of sintering agent has to be increased. Further, when the purity is less than 99.99%, the translucency may lower since an impurity absorbs lights, or an abnormal grain growth happens because of the presence of an impurity to remain pores.

The α alumina powder having a BET specific surface area of 1 to 10 $m^2/g$ described above has a purity of 99.99% or more. Water, organic substance and halogen contained in raw materials in an amount of less than 1 part by weight which can be removed from the raw materials by sintering at 1000° C. or lower do not deteriorate the features of the alumina sintered body of the present invention, and the presence thereof is permissible.

α Alumina powder having a BET specific surface area of 1 to 10 $m^2/g$ described above is preferably a powder comprising an α alumina particle having a D/H ratio of 0.5 or more to less than 2.0 when D represents the maximum particle diameter parallel to the hexagonal lattice plain of α alumina and H represents the maximum particle diameter vertical to the hexagonal closest lattice plain, having a number-average particle diameter of 0.01 μm or more to 1.0 μm or less, and having a particle size distribution D90/D10 of 10 or less when D10 and D90 represent the particle diameters at cumulative 10% and 90% from fine particle side of the cumulative particle size distribution, respectively.

In the present invention, magnesium oxide, and further, sintering agent such as yttrium oxide and the like are added to the above-mentioned α alumina powder having a BET specific surface area preferably from 1 to 10 $m^2/g$, more preferably from 2 to 7 $m^2/g$, further preferably from 3 to 5 $m^2/g$, and a solvent, organic binder, plasticizer and dispersing agent are mixed into the resulted mixed powder, to prepare a slurry. Next, Forming is effected using this slurry, and the green body is prefired at a temperature of from 500 to 1500° C. in atmosphere if necessary, then, the prefired body is sintered at a temperature of from 1700 to 1900° C. under reducing atmosphere from atmospheric pressure to vacuum, to produce the intended alumina sintered body.

As the sintering agent, a magnesium compound is added, or a magnesium compound and one or more compounds selected from the group consisting of compounds of group IIIA elements or group IVA elements of the periodic table in an amount of 1 to 100 wt % based on magnesium are added. Particularly, a magnesium compound is preferable, or further, a magnesium compound and a yttrium compound are preferable. Examples of these compounds include, but not limited to, oxides, nitrates, acetates, hydroxides, chlorides and the like, providing they are compounds converting into oxides at 1200° C. or less in prefiring in atmosphere. As the most suitable examples, magnesium nitrate is listed, or further, magnesium nitrate and yttrium nitrate are listed. Usually, magnesium is added to the above-mentioned alumina powder in an amount of 10 ppm or more to 100 ppm or less, preferably, 10 ppm or more to 50 ppm or less in terms of the oxide. Alternatively, yttrium is added to the above-mentioned alumina powder in an amount of 1 ppm or more to 100 ppm or less in terms of the oxide, preferably in an amount of 20 wt % of the amount of magnesium, in terms of the oxide, in addition to magnesium. For example, when magnesium oxide is added in an amount of 50 ppm, it is most preferable to add yttrium oxide in an amount of 10 ppm.

Next, a method for producing the slurry will be illustrated below. First, the above-mentioned alumina raw material powder, solvent and dispersing agent are compounded in suitable amounts, and mechanically stirred and mixed. In such procedure, mixing is generally widely conducted in a ball mill, while in the present invention, since the alumina powder used as a raw material is a powder having uniform particle form and containing little agglomeration, the powder is dispersed easily in a solvent to provide a uniform slurry by dispersing with an ultrasonic cleaner or dispersing by an ultrasonic homogenizer. A dispersing method using no media such as a ceramic ball and the like is not preferable from the standpoint of prevention of mixing of an oxide or salts of an element other than aluminum. It is desirable that the ultrasonic frequency has 10 kHz or more, preferably 25 kHz or more when the vessel content is 40 liter. It is desirable that the stirring and mixing time is, for example, 30 minutes or more when the amount of the slurry is 10 liter, though this time differs depending on the capacity of the slurry. After sufficient dispersion of the raw material powder as described above, an organic binder is mixed. It is desirable that this mixing is conducted for 1 hour or more when the amount of the slurry is 10 liter.

The slurry prepared as described above may be de-foamed under reduced pressure. Alternatively, various de-foaming agents may be used. Further, depending on the following forming method, the viscosity may be controlled to 50 to 10000 centi poise by the addition of various pH controllers and flocculating agents. For example, in granulation by a spray drier, it is preferable that the viscosity of the aluminum slurry is controlled to 300 to 400 centi poise by pH control with an aqueous hydrochloric acid solution or ammonia solution and the like, for producing spherical granules. Further, the concentration of alumina in the slurry can also be raised, by standing precipitation, concentration under reduced pressure by centrifugal separation, rotary evaporator and the like.

As the solvent, water is mainly used in the case of polyvinyl alcohol used as a binder in producing a granule by a spray drier, though it varies depending on the kind of a binder used and the forming method. Depending on recipe, various organic solvents may also be used.

As the dispersing agent, an ammonium salt of a polycarboxylic acid [for example, trade name: SN-Dispersant 5468, manufactured by SAN NOPCO Limitd (K.K.)] is mainly used when the solvent is water. Further, in the case of an organic solvent, ethyl oleate, sorbitan monooleate, sorbitan trioleate, polycarboxylic acid and the like are used, and particularly, as the alumina raw material powder used as a raw material in the present invention, a polyester-based powder [trade name; TEXAPHOR 3012, manufactured by SAN NOPCO Limitd (K.K.)] is preferable, however, the example is not limited to this. Depending on the organic binder used together, a slurry having lower viscosity can be produced when no dispersing agent is used.

Examples of the organic binder used in the present invention include, but are not limited to, polyvinyl alcohol, polyvinyl acetal, various acrylic polymers, methylcellulose, polyvinyl acetate, polyvinyl butyral system, various waxes and various polysaccharides.

As the plasticizer, ethylene glycol, diethylene glycol, polyethylene glycol, glycerine, polyglycerine, various esters and the like are used, though it varies depending on the organic binder used. Particularly, when an organic solvent is used, dibutyl phthalate, diethylhexyl phthalate and the like is preferably used, however, the examples thereof in the present invention are not limited to them.

In the present invention, though a lubricant, flocculating agent and pH controller can be added as the other additive, it is important that an inorganic impurity other than aluminum is not present in a solvent or an additive other than alumina. Further, for enhancing transparency, it is most preferable that an organic substance is not added at all providing no problem occur in shape keeping property of a green body and in handling in processing.

In the present invention, as the forming method, there can be used conventional methods such as a slip cast method, centrifugal cast method, extrusion molding method and the like, using the above-mentioned slurry. Further, after the above-mentioned slurry is made into a granule by spray dry and the like, the granule can be subjected to press forming and cold isostatic press.

In the case of the cold isostatic press, the above-mentioned slurry is made into a granule by spray dry and the like, this granule is pressed by a uniaxial press at a pressure preferably of 50 to 500 Kg/cm$^2$, more preferably of 200 to 300 kg/cm$^2$, then, pressed isotropically by a cold isostatic press machine at a pressure preferably of 0.5 to 3 t/cm$^2$, more preferably of 1.0 to 1.5 t/cm$^2$, and the resulted green body is processed into a given form.

A green body obtained by the above-mentioned method is prefired preferably for 1 hour or more at a temperature from 500 to 1500° C., more preferably for 3 hours or more at a temperature from 900 to 1200° C., for binder removal. Next, the green body is sintered at a temperature preferably from 1700 to 1900° C., more preferably from 1750 to 1850° C., further preferably from 1780 to 1820° C. under reducing atmosphere from atmospheric pressure to vacuum, preferably under hydrogen atmosphere of atmospheric pressure, to produce the intended translucent alumina. When the sintering temperature is less than 1700° C., translucency may be lower since the grain does not grow sufficiently. While, when sintering is conducted at a temperature higher than 1900° C., the grain size of the sintered body may increase, pores may remain, translucency may decrease and the mechanical strength of the sintered body may decrease.

The sintered body obtained by the production method of the present invention is a translucent alumina sintered body in which the total content of an alkali metal element and an alkaline earth metal element is as low as 50 ppm or less, and the linear transmittance of a light having a wavelength of 600 nm is 40% or more at a thickness of the sintered body of 0.85 mm. Further, the average particle diameter of the crystal structure of the above-mentioned sintered body is preferably 5 µm or more to 50 µm or less, and the particle diameter of the maximum structure in the crystal structure is preferably 1.5-fold or more of the average particle diameter and it is preferable that the structure is uniform.

The translucent alumina of the present invention is translucent alumina having excellent corrosion resistance suitable mainly for optical uses such as various lamp constitution members such as an arc tube and the like of a high-intensity discharge lamp such as a sodium discharge lamp or metal halide lamp and the like, as semiconductor production apparatus members such as a micro wave irradiation window, electrostatic chuck, dry etcher chamber, transfer hand, vacuum chuck, vacuum chamber and the like, as a side temperature window and the like of a high temperature apparatus, or as a bioceramics member for correction of teeth and the like.

Further, according to the present invention, the above-mentioned translucent alumina can be provided easily by a production method such as sintering and the like under hydrogen atmosphere of atmospheric pressure without requiring an excessively large equipment.

EXAMPLE

The following examples will illustrate the present invention in detail, but do not limit the scope of the present invention.

Various measurements in the present invention were conducted as follows.

(1) Measurement of BET Specific Surface Area

It was measured by Flow Sorb 2300 manufactured by Shimadzu Corp.

(2) Measurement of D10 and D90 (Measurement of Weight-cumulative Particle Size Distribution)

It was measured by a laser diffraction scattering method using a Master Sizer (manufactured by Malvern Co.). An alumina slurry is prepared by adding 25 g of a 0.5 wt % aqueous solution of sodium hexa-m-phosphate to 2.5 of an alumina powder, and irradiating this mixed solution with an ultrasonic for 2 minutes by a ultrasonic homogenizer.

(3) Measurement of D/H Ratio

Powder particles were photographed by using a scanning electron microscope (SEM, manufactured by JEOL Ltd.: T-300), and 5 to 10 particles were selected from this photograph and the image was analyzed and the average value thereof was calculated.

(4) Measurement of In-line Transmittance

The transmittance at a wavelength of 600 nm of a circular pellet having a thickness of 0.85 mm of which both surfaces had been mirror-polished using a diamond slurry was measured by using UV-1200 manufactured by Shimadzu Corp. (slit diameter: 0.50 mm).

(5) Observation of Sintered Body Microstructure of Translucent Alumina

The pellet used for measurement of transmittance in (4) was heated for 1 hour in air, and the surface thereof was photographed using an optical microscope (T-300: manufactured by Nikon Corp.) at a magnification of 100. The grain size was measured by a linear intercept technique from this photograph.

(6) Quantification of Alkali Metal Element (Quantification of Flame Color Luminosity Method)

A translucent alumina sintered body was ground in a boron nitride mortar, then, dissolved in ammonium dihydrogen phosphate. The spectrum of the flame color of this solution was measured by an atomic absorption spectro photometer (by SAS760, manufactured by Seiko Instruments Inc.) and quantified.

(7) Quantification of Alkaline Earth Metal Element (ICP-AES Quantification Method)

A translucent alumina sintered body was ground in a boron nitride mortar, then, alkali-melted. This melted material was analyzed by ICP emission (ICP emission spectral analysis apparatus, type SPS1200VR, manufactured by Seiko Instruments Inc.).

In comparative examples, AKP-20 (BET specific surface area: 4.2 m$^2$m/g) manufactured by Sumitomo Chemical Co., Ltd. and UA5105 (BET specific surface area: 9.4 m$^2$/g) manufactured by Showa Denko K.K.) were used as an alumina powder having a purity of 99.99% which is not in the form of polyhedron and have fractured surfaces.

Example 1

α Alumina powders manufactured by Sumitomo Chemical Co., Ltd. (trade name: SUMICORUNDUM AAO4) was used as a raw material. These alumina powders comprise a polyhedral particle having 8 to 20 surfaces having substantially no fractured surface, and have a D/H ratio of 1. The BET specific surface area was 3.5 m$^2$/g. The average particle diameter of this powder by a laser diffraction scattering method was 0.52 μm. 5000 g of an AAO4 powder, 3100 g of water (solvent), 0.8 g (25 ppm as magnesium oxide based on alumina powder) of magnesium nitrate hexahydrate (guaranteed reagent), and 63.5 g of a 40 wt % aqueous solution of ammonium polycarboxylate, dispersing agent (trade name SN-Dispersant 5468, manufactured by SANNOPCO LIMITED) were mixed by stirring for 30 minutes while dispersing with an ultrasonic disperser. Then, 1000 g of a 10 wt % solution of polyvinyl alcohol (trade name PVA-205C, manufactured by Kuraray Co., Ltd.) as an organic binder and 50 g of polyethylene glycol #400 (guaranteed reagent) as a plasticizer were added and mixed by stirring for 60 minutes to prepare a slurry.

This slurry was spray-dried by a spray drier to produce a granule. This granule was humidified to a water content of 0.5 wt %, then, filled in a die, and formed into a cylindrical green body having a diameter of 20 mm and a height of 5 mm by an oil hydraulic uniaxial press machine under a load of 0.3 t/cm$^2$ and a cold isostatic press under a load of 1.5 t/cm$^2$. Then, this green body was prefired for 3 hours at 900° C. in atmosphere to remove an organic binder, then, sintered for 4 hours at 1800° C. in hydrogen (due point: 0° C.). The in line transmittance of the resulted sintered body was 40%. The average grain size of the sintered body was 36 μm, and the maximum grain size was 50 μm.

In the resulted sintered body, Mg=16 ppm, Li<2 ppm, Na<5 ppm, K<2 ppm, and other alkali metal elements<1 ppm, other alkaline earth metal elements<1 ppm, and the total amount of alkali metal elements and alkaline earth metal elements was less than 30 ppm.

Example 2

100 g of the AAO4 powder described in Example 1, 300 g of ethanol and 0.016 g of magnesium nitrate hexahydrate were mixed by stirring for 30 minutes while dispersing with an ultrasonic disperser. Then, ethanol was removed by a rotary evaporator to obtain a cake. This cake was dried with hot air at 150° C., then, ground in a mortar. The resulted powder was filled in a die, and formed into a cylindrical molded product having a diameter of 20 mm and a height of 5 mm by an oil hydraulic uniaxial press machine under a load of 0.3 t/cm$^2$ and a cold isostatic press under a load of 1.0 t/cm$^2$. This green body was prefired at 900° C. in atmosphere, then, sintered for 4 hours at 1800° C. in hydrogen. The in line transmittance of the resulted sintered body was 50%. The average grain size of the sintered body was 40 μm, and the maximum grain size was 55 μm.

In the resulted sintered body, Mg=16 ppm, Li<2 ppm, Na<5 ppm, K<2 ppm, and other alkali metal elements<1 ppm, other alkaline earth metal elements<1 ppm, and the total amount of alkali metal elements and alkaline earth metal elements was less than 30 ppm.

Example 3

5000 g of the AAO4 powder described in Example 1, 3100 g of water, 0.8 g of magnesium nitrate hexahydrate, 0.085 g of yttrium nitrate hexahydrate (5 ppm as yttrium oxide based on the total alumina powder) and 62.5 g of a dispersing agent, SN-Dispersant 5468 were mixed by stirring for 30 minutes while dispersing with an ultrasonic disperser. Then, 1000 g of a 10 wt % solution of PVA-205C as an organic binder and 50 g of polyethylene glycol #400 as a plasticizer were added and mixed by stirring for 60 minutes to prepare a slurry.

This slurry was spray-dried by a spray drier to produce a granule. This granule was humidified to a water content of 0.5 wt %, then, filled in a die, and formed into a cylindrical green body having a diameter of 20 mm and a height of 5 mm by an oil hydraulic uniaxial press machine under a load of 0.3 t/cm$^2$ and a cold isostatic press under a load of 1.5 t/cm$^2$. Then, this green body was prefired at 900° C. for 3 hours in atmosphere to remove the organic binder, then, sintered for 4 hours at 1820° C. in hydrogen (due point: 0° C.). The in line transmittance of the resulted sintered body was 40%. The average grain size of the sintered body was 36 μm, and the maximum grain size was 50 μm.

In the resulted sintered body, Mg=16 ppm, Li<2 ppm, Na<5 ppm, K<2 ppm, and other alkali metal elements <1 ppm, other alkaline earth metal elements <1 ppm, and the total amount of alkali metal elements and alkaline earth metal elements was less than 30 ppm.

Example 4

5000 g of the AAO4 powder described in Example 1, 3100 g of water (solvent), 1.6 g of magnesium nitrate hexahydrate (5 ppm as magnesium oxide based on the total alumina powder) (guaranteed reagent) and 63.5 g of a 40 wt % aqueous solution of ammonium polycarboxylate, dispersing agent (trade name SN-Dispersant 5468, manufactured by SAN NOPCO) were mixed by stirring for 30 minutes while dispersing with an ultrasonic disperser. Then, 1000 g of a 10 wt % solution of polyvinyl alcohol (trade name PVA-205C, manufactured by Kuraray Co., Ltd.) as an organic binder and 50 g of polyethylene glycol #400 (guaranteed reagent) as a plasticizer were added and mixed by stirring for 60 minutes to prepare a slurry.

This slurry was spray-dried by a spray drier to produce a granule. This granule was humidified to a water content of 0.5 wt %, then, filled in a die, and formed into a cylindrical green body having a diameter of 20 mm and a height of 5 mm by an oil hydraulic uniaxial press machine under a load of 0.3 t/cm2 and a cold isostatic press under a load of 1.5 t/cm$^2$. Then, this green body was prefired at 900° C. for 3 hours in atmosphere to remove the organic binder, then, sintered for 4 hours at 1800° C. in hydrogen (due point: 0° C.). The in line (linear) transmittance of the resulted sintered body was 49%. The average grain size of the sintered body was 36 μm, and the maximum grain size was 50 μm.

In the resulted sintered body, Mg=32 ppm, Li<2 ppm, Na<5 ppm, K<2 ppm, and other alkali metal elements <1 ppm, other alkaline earth metal elements <1 ppm, and the total amount of alkali metal elements and alkaline earth metal elements was less than 50 ppm.

Example 5

100 g of the AA04 powder described in Example 1, 300 g of ethanol and 0.032 g of magnesium nitrate hexahydrate were mixed by stirring for 30 minutes while irradiating with an ultrasonic wave. Then, ethanol was removed by a rotary evaporator to obtain a cake. This cake was dried with hot air at 150° C., then, ground in a mortar. The resulted powder was filled in a die, and formed into a cylindrical green body having a diameter of 20 mm and a height of 5 mm by an oil hydraulic uniaxial press machine under a load of 0.3 t/cm$^2$ and a cold isostatic press under a load of 1.0 t/cm$^2$. This green body prefired at 900° C. in atmosphere, then, sintered for 4 hours at1800° C. in hydrogen. The in line transmittance of the resulted sintered body was 64%. The average grain size of the sintered body was 36 μm, and the maximum grain size was 50 μm.

In the resulted sintered body, Mg=32 ppm, Li<2 ppm, Na<5 ppm, K<2 ppm, and other alkali metal elements <1 ppm, other alkaline earth metal elements <1 ppm, and the total amount of alkali metal elements and alkaline earth metal elements was less than 50 ppm.

Example 6

100 g of the AA04 powder described in Example 1, 300 g of ethanol, 0.032 g of magnesium nitrate hexahydrate and 0.0034 g of yttrium nitrate hexahydrate (10 ppm as yttrium oxide based on alumina powder) were mixed by stirring for 30 minutes while dispersing with an ultrasonic disperser. Then, ethanol was removed by a rotary evaporator to obtain a cake. This cake was dried with hot air at 150° C., then, ground in a mortar. The resulted powder was filled in a die(mold), and formed into a cylindrical green body having a diameter of 20 mm and a height of 5 mm by an oil hydraulic uniaxial press machine under a load of 0.3 t/cm$^2$ and a cold isostatic press under a load of 1.0 t/cm$^2$. This green body was prefired at 900° C. in atmosphere, then, sintered for 4 hours at 1800° C. in hydrogen. The in line transmittance of the resulted sintered body was 60%. The average grain size of the sintered body was 36 μm, and the maximum grain size was 50 μm.

Example 7

α Alumina powders manufactured by Sumitomo Chemical Co., Ltd. (trade name: SUMICORUNDUM AAO3) were used as a raw material. These alumina powders comprise a polyhedral particle having 8 to 20 surfaces having substantially no fractured surface, and have a D/H ratio of 1. The BET specific surface area was 5.2 m$^2$/g. The average particle diameter of this powder by a laser diffraction scattering method was 0.45 μm. 5000 g of an AAO3 powder, 3100 g of water (solvent). 1.6 g of magnesium nitrate hexahydrate (50 ppm as magnesium oxide based on alumina powder) (guaranteed reagent), and 63.5 g of a 40 wt % aqueous solution of polyammonium carboxylate, dispersing agent (trade name SN-D5468, manufactured by SUN NOPCO) were mixed by stirring for 30 minutes while dispersing with an ultrasonic disperser. Then, 1000 g of a 10 wt % solution of polyvinyl alcohol (trade name PVA-205C, manufactured by Kuraray Co., Ltd.) as an organic binder and 50 g of polyethylene glycol #400 (guaranteed reagent) as a plasticizer were added and mixed by stirring for 60 minutes to prepare a slurry.

This slurry was spray-dried by a spray drier to produce a granule. This granule was humidified to a water content of 0.5 wt %, then, filled in a die, and formed into a cylindrical green body having a diameter of 20 mm and a height of 5 mm by an oil hydraulic uniaxial press machine under a load of 0.3 t/cm$^2$ and a cold isostatic press under a load of 1.5 t/cm$^2$. Then, this molded product was calcined for 3 hours at 900° C. in atmosphere to remove an organic binder, then, sintered for 4 hours at 1800° C. in hydrogen (due point: 0° C.). The in line transmittance of the resulted sintered body was 45%. The average grain size of the sintered body was 36 μm, and the maximum grain size was 50 μm.

In the resulted sintered body, Mg=32 ppm, Li<2 ppm, Na<5 ppm, K<2 ppm, and other alkali metal elements <1 ppm, other alkaline earth metal elements <1 ppm, and the total amount of alkali metal elements and alkaline earth metal elements was less than 50 ppm.

Comparative Example 1

An α alumina raw material powder having a purity of 99.99% (AKP-20, manufactured by Sumitomo Chemical Co., Ltd.) was used. The primary particle of this alumina particle was an amorphous particle not in the form of polyhedron, and the D/H ratio was over 2. The BET specific surface area was 4.2 m$^2$/g. The average particle diameter of this powder by a laser diffraction scattering method was 0.54 μm.

5000 g of an AKP-20 powder, 3100 g of water, 1.6 g of magnesium nitrate hexahydrate (50 ppm as magnesium oxide based on total alumina powder) and 62.5 g of a dispersing agent, SN-Dispersant 5468 were mixed by stirring for 30 minutes while dispersing with an ultrasonic disperser. Then, 1000 g of a 10 wt % solution of PVA2O5c as an organic binder and 50 g of polyethylene glycol (degree of polymerization: 400) as a plasticizer were added and mixed by stirring for 60 minutes to prepare a slurry.

This slurry was spray-dried by a spray drier to produce a granule. This granule was humidified to a water content of 0.5 wt %, then, filled in a die , and formed into a cylindrical green body having a diameter of 20 mm and a height of 10 mm by an oil hydraulic uniaxial press machine under a load of 0.7 t/cm$^2$ and a cold isostatic press under a load of 1.5 t/cm$^2$. Then, this green body was prefired for 3 hours at 900° C., then, sintered for 4 hours at 1820° C. in hydrogen (due point: 0° C.). The resulted sintered body was opaque, and the in line transmittance thereof was 0%.

Comparative Example 2

100 g of the AKP-20 powder described in Comparative Example 1,300 g of ethanol and 0.032 g of magnesium nitrate hexahydrate were mixed by stirring for 30 minutes while dispersing with an ultrasonic disperser. Then, ethanol was removed by a rotary evaporator to obtain a cake. This cake was dried with hot air at 150° C., then, ground in a mortar. The resulted powder was filled in a die, and formed into a cylindrical green body having a diameter of 20 mm and a height of 5 mm by an oil hydraulic uniaxial press machine under a load of 0.3 t/cm$^2$ and a cold isostatic press under a load of 1.0 t/cm$^2$. This green body was prefired at 900° C. in atmosphere, then, sintered for 4 hours at 1800° C. in hydrogen. The resulted sintered body was opaque, and the in line transmittance thereof was 0%.

Comparative Example 3

100 g of the AKP-20 powder described in Comparative Example 1, 300 g of ethanol, 0.032 g of magnesium nitrate hexahydrate and 0.0034 g of yttrium nitrate hexahydrate (10 ppm as yttrium oxide based on alumina powder) were mixed by stirring for 30 minutes while dispersing with an ultrasonic disperser. Then, ethanol was removed by a rotary evaporator to obtain a cake. This cake was dried with hot air at 150° C., then, ground in a mortar. The resulted powder was filled in a die, and formed into a cylindrical green body having a diameter of 20 mm and a height of 5 mm by an oil hydraulic uniaxial press machine under a load of 0.3 t/cm$^2$ and a cold hydrostatic press under a load of 1.0 t/cm$^2$. This green body was prefired at 900° C. in atmosphere, then, sintered for 4 hours at 1800° C. in hydrogen. The resulted sintered body was opaque, and the in line transmittance thereof was 0%.

Comparative Example 4

An α alumina raw material powder having a purity of 99.99% (UA5105, manufactured by Showa Denko Co., Ltd.) was used. The primary particle of this alumina particle was an amorphous particle not in the form of polyhedron, and the D/H ratio was over 2. The BET specific surface area was 9.4 m$^2$/g. The average particle diameter of this powder by a laser diffraction scattering method was 1.20 μm.

5000 g of an UA5105 powder, 3100 g of water, 1.6 g of magnesium nitrate hexahydrate and 62.5 g of a dispersing agent, SN-D5468 were mixed by stirring for 30 minutes while dispersing with an ultrasonic disperser. Then, the mixture was ball milled for 3 hours using plastic balls containing iron spheres as media. Then, further, 1000 g of a 10 wt % solution of PVA2O5c as an organic binder and 50 g of polyethylene glycol (degree of polymerization: 400) as a plasticizer were added simultaneously and subjected to ball milling for 3 hours to prepare a slurry.

This slurry was spray-dried by a spray drier to produce a granule. This granule was humidified to a water content of 0.5 wt %, then, filled in a die, and formed into a cylindrical green body having a diameter of 20 mm and a height of 10 mm by an oil hydraulic uniaxial press machine under a load of 0.7 t/cm$^2$ and a cold isostatic press under a load of 1.5 t/cm$^2$. Then, this green body was prefired for 3 hours at 1200° C., then, sintered for 4 hours at 1820° C. in hydrogen (due point: 0° C.). The resulted sintered body was opaque, and the in line transmittance thereof was 0%. In the resulted sintered body, Mg=31 ppm, Li<2 ppm, Na=17 ppm, K=2 ppm, and other alkali metal elements <1 ppm, other alkaline earth metal elements <1 ppm, and the total amount of alkali metal elements and alkaline earth metal elements was over 50 ppm.

Comparative Example 5

100 g of the UA-5105 powder described in Comparative Example 4,300 g of ethanol and 0.032 g of magnesium nitrate hexahydrate (50 ppm as magnesium oxide based on the total alumina powder) were mixed by stirring for 30 minutes while irradiating with an ultrasonic wave. Then, ethanol was removed by a rotary evaporator to obtain a cake. This cake was dried with hot air at 150° C., then, ground in a mortar. The resulted powder was filled in a die, and formed into a cylindrical green body having a diameter of 20 mm and a height of 5 mm by an oil hydraulic uniaxial press machine under a load of 0.3 t/cm$^2$ and a cold isostatic press under a load of 1.0 t/cm$^2$. This green body was prefired at 900° C. in atmosphere, then, sintered for 4 hours at 1800° C. in hydrogen.

In the resulted sintered body, Mg=38 ppm, Li<2 ppm, Na=45 ppm, K<2 ppm, Ca=13 ppm and other alkali metal elements <1 ppm, other alkaline earth metal elements <1 ppm, and the total amount of alkali metal elements and alkaline earth metal elements was less than 50 ppm. The in line transmittance was 5%.

Comparative Example 6

100 g of the USA5105 powder described in Comparative Example 4, 300 g of ethanol, 0.032 g of magnesium nitrate hexahydrate and 0.0034 g of yttrium nitrate (5 ppm as yttrium oxide based on alumina) were mixed by stirring for 30 minutes while dispersing with an ultasonic disperser. Then, ethanol was removed by a rotary evaporator to obtain a cake. This cake was dried with hot air at 150° C., then, ground in a mortar. The resulted powder was filled in a die, and formed into a cylindrical green body having a diameter of 20 mm and a height of 5 mm by an oil hydraulic uniaxial press)machine under a load of 0.3 t/cm$^2$ and a cold isostatic press under a load of 1.0 t/cm$^2$. This green body was prefired at 900° C. in atmosphere, then, sintered for 4 hours at 1800° C. in hydrogen. The resulted sintered body was opague, and the in line transmittance thereof was 0%.

As described in Examples 1 to 7 and Comparative Examples 1 to 6, when an α alumina powder comprising a polyhedral primary particle having no fracture surface is used as a raw material, translucent alumina having a in line transmittance of 40% or more in which the sintered body microstructure is uniform can be obtained by the addition of magnesium oxide of 50 ppm or less, while, when other α alumina powder is used as a raw material, the sintered boy microstructure is non-uniform, and a lot of pores remain in the sintered body, therefore, the sintered body is opaque and translucency of a in line transmittance of only less than 10% is obtained. The above-described results are shown in Table 1.

TABLE 1

| | Alumina BET specific surface area | | Sintering agent | | Grain size (μm) | | In line | Amount of element remaining in sintered body (ppm) | | | | | | |
|---|---|---|---|---|---|---|---|---|---|---|---|---|---|---|
| | Raw material powder | m²/g | Raw material form | (addition amount/ppm) MgO | Y₂O₃ | Average Grain size | Maximum grain size | Transmittance % | Li | Na | K | Mg | Ca | Sr | Ba |
| Example 1 | AA04 | 3.5 | Granule | 25 | | 36 | 50 | 40 | <2 | <5 | <2 | 16 | <1 | <1 | <1 |
| Example 2 | AA04 | 3.5 | Mixed powder | 25 | | 40 | 55 | 50 | <2 | <5 | <2 | 16 | <1 | <1 | <1 |
| Example 3 | AA04 | 3.5 | Granule | 25 | 5 | 36 | 50 | 40 | <2 | <5 | <2 | 16 | <1 | <1 | <1 |
| Example 4 | AA04 | 3.5 | Granule | 50 | | 36 | 50 | 49 | <2 | <5 | <2 | 32 | <1 | <1 | <1 |
| Example 5 | AA04 | 3.5 | Mixed powder | 50 | | 36 | 50 | 64 | <2 | <5 | <2 | 32 | <1 | <1 | <1 |
| Example 6 | AA04 | 3.5 | Mixed powder | 50 | 10 | 36 | 50 | 60 | <2 | <5 | <2 | 32 | <1 | <1 | <1 |
| Example 7 | AA03 | 5.2 | Granule | 50 | | 36 | 50 | 45 | <2 | <5 | <2 | 32 | <1 | <1 | <1 |
| Comparative example 1 | AKP-20 | 4.2 | Granule | 50 | | — | — | Opaque | — | — | — | — | — | — | — |
| Comparative example 2 | AKP-20 | 4.2 | Mixed powder | 50 | | — | — | Opaque | — | — | — | — | — | — | — |
| Comparative example 3 | AKP-20 | 4.2 | Mixed powder | 50 | 10 | — | — | Opaque | <2 | 17 | <2 | 31 | <1 | <1 | <1 |
| Comparative example 4 | UA5105 | 9.4 | Granule | 50 | | — | — | Opaque | — | — | — | — | | | |
| Comparative example 5 | UA5105 | 9.4 | Mixed powder | 50 | | — | — | 5 | <2 | 45 | <2 | 38 | 13 | <1 | <1 |
| Comparative example 6 | UA5105 | 9.4 | Mixed powder | 50 | 10 | — | — | Opaque | — | — | — | — | — | — | — |

What is claimed is:

1. A translucent alumina sintered body wherein the total content of an alkali metal element and an alkaline earth metal element is 50 ppm or less, and the in line transmittance of a light having a wavelength of 600 nm is 40% or more at a thickness of the sintered body of 0.85 mm.

2. The translucent alumina sintered body according to claim 1 wherein the average grain size the alumina sintered body is 5 to 50 μm, and the maximum grain size (particle diameter of the maximum structure in the crystal structure) is 1.5-fold or more of the average grain size.

3. A method for producing a translucent alumina sintered body according to claim 1, wherein the sintered body is obtained by forming a mixed powder prepared by adding a sintering agent to an α alumina powder which comprises a polyhedral primary particle having substantially no fractured surface, has a BET specific surface area of 1 to 10 m²/g and has a purity of 99.99% or more, and sintering the green body at a temperature of from 1700 to 1900° C. under reducing atmosphere from atmospheric pressure to vacuum.

4. The method for producing a translucent alumina sintered body according to claim 3, wherein the sintering agent is a magnesium compound and the addition amount thereof is 10–100 ppm in terms of the oxide based on the total amount of alumina.

5. A method for producing a translucent alumina sintered body according to claim 1, wherein the sintered body is obtained by forming a mixed powder prepared by adding a magnesium compound in an amount of 10 to 100 ppm in terms of the oxide based on the total amount of alumina, or a magnesium compound in an amount of 10 to 100 ppm in terms of the oxide based on the total amount of alumina and one or more compounds selected from the group consisting of compounds of group IIIA elements and group IVA elements of the periodic table in an amount of 1 to 100 wt % in terms of the oxide based on the total amount of the magnesium compound, to an α alumina powder which comprises a polyhedral primary particle having substantially no fractured surface, has a BET specific surface area of 1 to 10 m²/g and has a purity of 99.99% or more, and sintering the green body at a temperature of from 1700 to 1900° C. under reducing atmosphere from atmospheric pressure to vacuum.

6. The method for producing a translucent alumina sintered body according to claim 3 comprising the steps of (1) mixing a mixed powder according to claim 3 with organic binder, plasticizer, dispersing agent, lubricant, and water or an organic solvent to prepare a slurry, (2) forming said slurry, and (3) prefiring said green body in atmosphere at a temperature of from 500 to 1500° C., and then sintering the prefired green body under reducing atmosphere of from atmospheric pressure to vacuum at a temperature of from 1700 to 1900° C.

7. The method for producing a translucent alumina sintered body according to claim 6, wherein the slurry is a slurry obtained by dispersing an alumina powder only by mechanical stirring, or a slurry obtained by dispersing an alumina powder by mechanical stirring and ultrasonic dispersing.

8. A lamp constitution member comprising a translucent alumina sintered body according to claim 1.

9. A semiconductor producing apparatus member comprising a translucent alumina sintered body according to claim 1.

10. A bioceramics member comprising a translucent alumina sintered body according to claim 1.

* * * * *